US006919968B1

(12) United States Patent
Petschik

(10) Patent No.: US 6,919,968 B1
(45) Date of Patent: Jul. 19, 2005

(54) IMAGE PROCESSING METHOD AND CIRCUIT ARRANGEMENT FOR CHANGING IMAGE RESOLUTION

(75) Inventor: Benno Petschik, Markt Schwaben (DE)

(73) Assignee: Océ Printing Systems GmbH, Poing (DE)

( * ) Notice: Subject to any disclaimer, the term of this patent is extended or adjusted under 35 U.S.C. 154(b) by 0 days.

(21) Appl. No.: 09/381,991

(22) PCT Filed: Mar. 26, 1998

(86) PCT No.: PCT/DE98/00907

§ 371 (c)(1),
(2), (4) Date: Dec. 6, 1999

(87) PCT Pub. No.: WO98/43207

PCT Pub. Date: Oct. 1, 1998

(30) Foreign Application Priority Data

Mar. 27, 1997 (DE) .......................... 197 13 079

(51) Int. Cl.⁷ ............................................. G06F 15/00
(52) U.S. Cl. ......................... 358/1.2; 358/1.1; 358/1.5; 358/1.9
(58) Field of Search .................... 358/1.2, 1.1, 1.5, 358/1.9; 382/240.25, 333, 334, 240, 277; 348/39, 36, 38, 580, 629, 583; 345/426, 586, 593

(56) References Cited

U.S. PATENT DOCUMENTS 5,561,725 A * 10/1996 Degi et al. .................. 382/299
5,594,845 A * 1/1997 Florent et al. .............. 345/427

FOREIGN PATENT DOCUMENTS

| DE | 42 06 277 A1 | 6/1993 |
| EP | 0 149 120 | 7/1985 |
| EP | 0 708 415 A2 | 4/1996 |

OTHER PUBLICATIONS

Patent Abstracts of Japan, 57097271, Jun. 16, 1982, Watai Katshiro, entitled "Thinning Out and Shrinking System and Device for Facsimile Device".

IBM Technical Disclosure Bulletin, vol. 34, No. 2, Jul. 1991, "Image Scaling with Two–Dimensional Memory Arrays", pp. 1–9.

* cited by examiner

*Primary Examiner*—Twyler Lamb
(74) *Attorney, Agent, or Firm*—Schiff Hardin LLP

(57) ABSTRACT

Disclosed is a method for processing graphic data, specifically in a printer, wherein the source image to be processed contains source image elements arranged in a matrix, to each of which source image data is allocated. The target image obtained during processing contains target image elements arranged in a matrix, to each of which target image data is allocated. The source image is subdivided into partial source images arranged in a matrix. The target image data of a corresponding partial target image is determined for each partial source image on the basis of the source image data. Resolution is changed since the number of source image data of each partial source image differs from the number of target image data of each partial target image.

12 Claims, 8 Drawing Sheets

Figure 1:
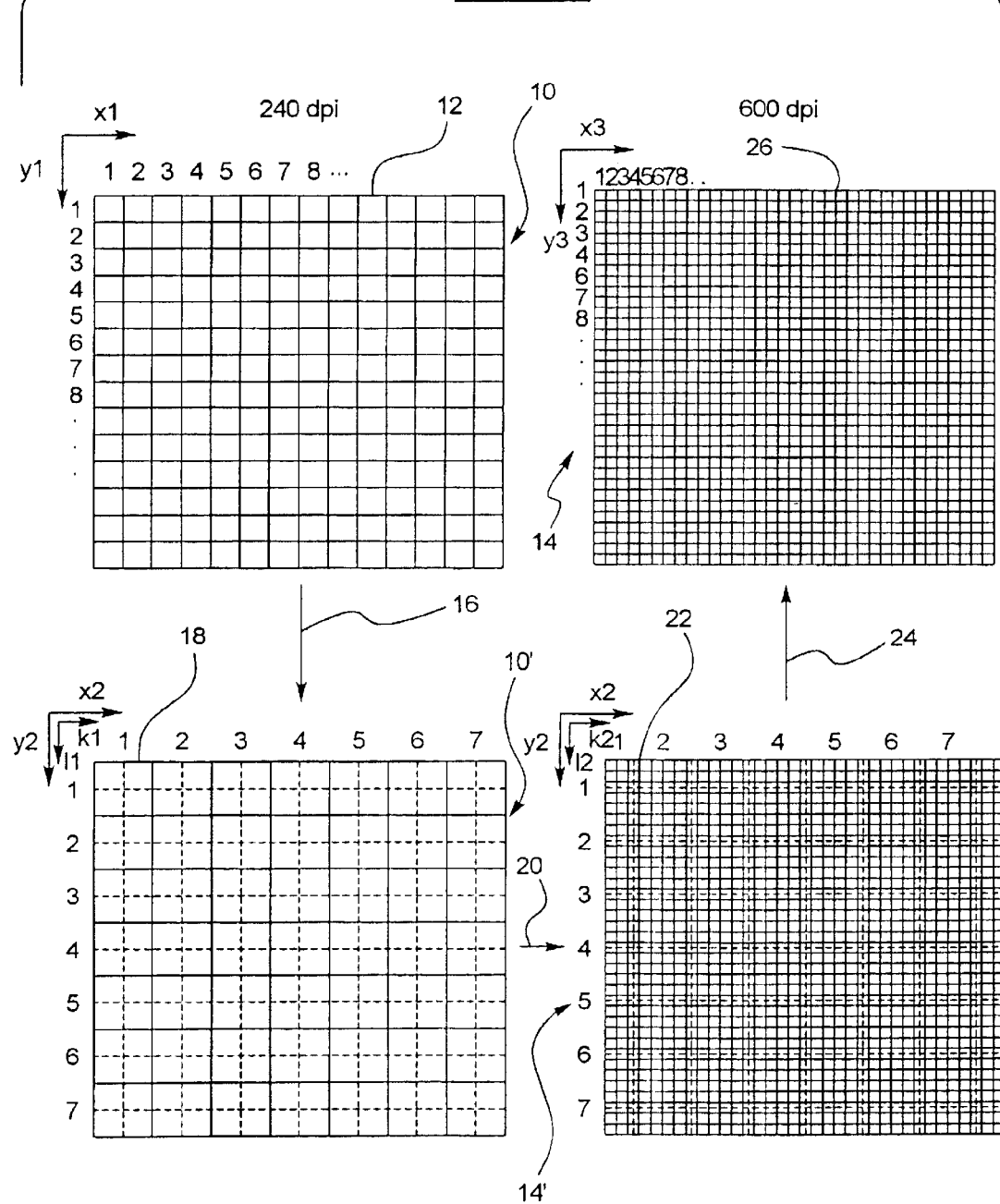

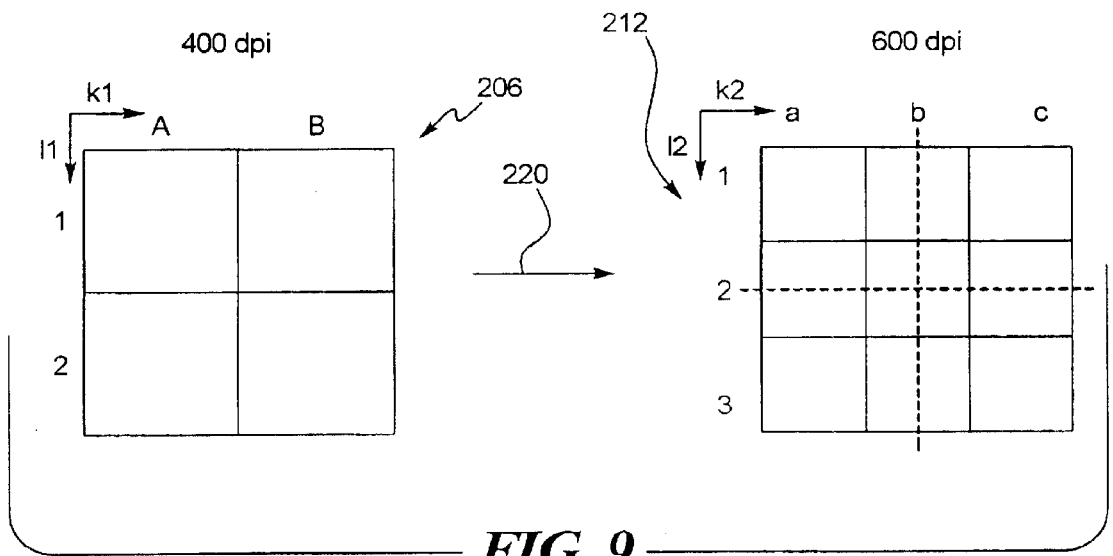
FIG. 9
FIG. 10
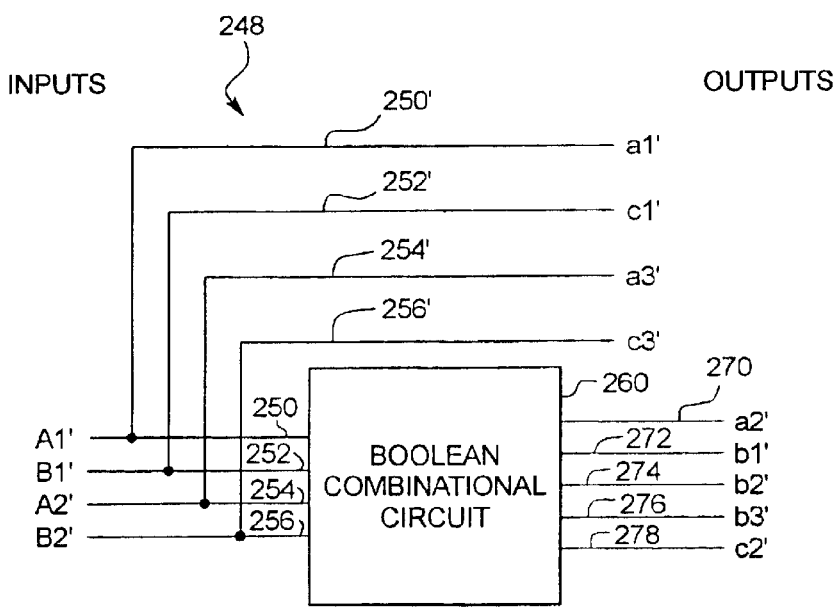

IMAGE PROCESSING METHOD AND CIRCUIT ARRANGEMENT FOR CHANGING IMAGE RESOLUTION

The invention is directed to a method for processing image data, whereby a source image to be processed contains source picture elements arranged matrix-like to which a source image datum is respectively allocated that determines the presentation of the respective source picture element. A target image having target picture elements arranged matrix-like arises in the processing. A target image datum that determines the presentation of the respective target picture element is allocated to each target picture element.

In the case of black/white printer, the picture elements are either black picture elements or picture elements having the color of the image carrier. When, for example, the image carrier is white, then the latter are white picture elements. For generating the print image, the picture elements given a known printer are generated on a photoconductor with light-emitting elements, for example light-emitting diodes (LED) joined to one another in a predetermined spacing.

The resolution of the printer is defined as the plurality of picture elements per path unit in line direction or, respectively, column direction of an image. A distance of 25.4 mm is usually selected as path unit in printing technology (25.4 mm=1 inch). In this case, the unit of the resolution is picture elements per 25.4 mm, dpi in brief (dots per inch). The resolution of the printer with adjoining light sources is firmly prescribed by the spacing of these light sources from one another, for example 600 dpi. When a source image is then to be printed with a resolution of, for example, 240 dpi or 400 dpi, then a target image having a resolution of 600 dpi must first be produced from the source image. The image contents of the source image such as, for example, horizontal lines, vertical lines and slanting lines but circles or the like as well should thereby be presented optimally unfalsified in the target image.

The production of a target image is uncritical when the resolution of the target image amounts to a whole multiple of the resolution of the source image. In this case, the source picture elements are copied and employed as target picture elements. Such a method is disclosed, for example, by EP 0 708 415 A2.

Relationships that are not whole-numbered such as, for example, the aforementioned conversions from 240 dpi to 600 dpi and from 400 dpi to 600 dpi are problematical since decisions or, respectively, calculating operations are required in these cases in order to present picture elements in the target image according to predetermined rules. Multiplications with factors unequal to a power of 2 as well as rounding operations, etc., are thereby particularly disturbing since they require a great detail of calculating time. Due to the multitude of picture elements in an image, for example several million, however, the calculating time is particularly weighty.

DE 42 06 277 A1 discloses a method for converting digital image data from a 200 dpi source raster into a 300 dpi target raster. Respectively 2×2 picture elements in the source raster are thereby converted to 3×3 picture elements in the target raster; the amount of image data is thus considerably increased. EP 149 120 A2 likewise discloses a method for expanding the image data. In both known methods, image data are inserted dependent on the values of the respective neighboring picture elements.

It is required in the conversion of image data from a source raster having a first resolution into a target raster having a second resolution that lines are reproduced as true to the original as possible. In particular, it is demanded that the line widths be preserved. The method according to DE 42 06 277 A1 cannot satisfactorily meet this demand because half lines would have to be presented for this purpose in the 300 dpi raster. This is not possible in a digital system. The method disclosed by EP 149 120 A2 also does not give a satisfactory answer to this demand.

In a conversion of the image data by the factor 2.5 from a 240 dpi source raster onto a 600 dpi target raster, the aforementioned demand leads thereto that a line having the width of one dot in the 240 dpi raster must be converted into a line having the width of 2.5 dots in the 600 dpi raster. Since half line widths cannot be presented in a binary system, such lines are often presented falsified in the target raster.

The article "Image scaling with two-dimensional memory arrays", IBM Technical Disclosure Bulletin, Vol. 34, No. 2, July 1991, pages 4–9, XP 000210549, discloses a method and a circuit for scaling image data. The circuit is optimized for specific image processing operations and can implement its operations independently of a system processor. The scaling ensues in that image lines or image columns are repeated or deleted. This method, however, is disadvantageous in view of the true-to-the-original reproduction of lines, particularly in the conversion of thin lines by scaling factors that are not whole-numbered because an information loss occurs in the deletion events.

Patent Abstracts of Japan, Vol. 006, No. 182 (E-131), 18 Sep. 1982 or, respectively, JP 57-097271 A likewise discloses a scaling method. Data are thereby also deleted, as a result whereof information are lost.

It is therefore an object of the invention to specify a method for processing image data that, with little outlay and at high speed, generates a target image with modified resolution from a source image and that reproduces lines as true to the original as possible.

This object is achieved by a method comprising the features of patent claim 1 and by a circuit comprising the features of patent claim 9. Advantageous embodiments are recited in the subclaims.

The invention is based on the consideration that the generation of the target image is especially simple when the decisions to be made when generating the target image are as simple as possible. The decisions become simple particularly when respectively only a few or even only one picture element of the source image influences the presentation of a picture element in the target image and must thus be taken into consideration in the decision. Moreover, a plurality of parts of the target image should be capable of being simultaneously generated in order to reduce the overall time for generating the target image and, thus, the overall time for the printing as well.

In the method of the invention, the source image is therefore subdivided into source sub-images arranged matrix-like that essentially contain the same number of source picture elements. The matrix-like arrangement of the source sub-images assumes that all source sub-images contain essentially the same number of source picture elements. Only in edge regions of the source image can a deviating number of source picture elements per source sub-image occur. As a rule, however, only source sub-images are processed wherein all source sub-images contain the same number of source picture elements.

Due to the subdivision of the source image, what the invention achieves is that the conversion of the source image into the target image is divided into individual conversions of the source sub-images into target sub-images. The individual conversions are ultimately simpler to realize and can also be simultaneously implemented.

According to the invention, the conversion ensues such that the presentation of non whole-numbered line widths in the target raster ensues in that the line is thinned in the target raster. The conversion particularly ensues such that lines that do not comprise a whole-numbered line width in the target raster are thinned with a periodicity that is a whole-numbered multiple of the conversion factor. The periodicity thereby particularly corresponds to the smallest unit presentable in the target raster. Given a conversion of the image data from 240 dpi to 600 dpi, for example, a half line width is presented in the 600 dpi line raster in that the line is thinned with a periodicity of five.

When thinning a line, successive, identical image data of the line in the target raster are periodically converted to the inverse value, for example from zero to one. Instead of a continuous black stroke, for example, a tine structure is thereby presented.

By thinning a line, the line width of the original line of the source raster is approximated to an extremely high degree in the target raster. For a viewer of a corresponding print out, a line generated with the inventive method and printed in the target raster can practically not be distinguished from an original line printed in the source raster because the blackened areas are of nearly the same size. The method is particularly suited for print outs on electrophotographic printers.

In the method of the invention, the target image data of an appertaining target sub-image from the source image data of a respective source sub-image continue to be determined according to calculating operations that are essentially the same for all sub-images. Differences can occur given source sub-images and target sub-images that lie at the edge of the source image or, respectively, of the target image. The calculating operations can be simple logical operations such as, for example, AND operations, OR operations, logical negation or identity as well. Other calculating operations can likewise be applied. Preferably, however, what are referred to as Boolean calculating operations that are simple to realize in circuit-oriented terms are implemented, these including said operations.

The number of source image data per source sub-image differs in the inventive method from the number of target image data per target sub-image. It is this measure that achieves the modification of the resolution. When increasing the resolution, the number of target image data per target sub-image is greater than the number of source image data per source sub-image. I.E., more target image data must be generated per sub-image or, respectively, for the entire image as well than are present as source image data. When reducing the resolution, the conditions are reversed. This means that the plurality of image data of the source image is greater than the number of image data of the target image.

In the method of the invention, the individual target sub-images are respectively arranged at a position in the target image that coincides with the position of the respectively appertaining source sub-image in the source image. The target sub-images are thus also arranged matrix-like in the target image. The equality of position assures that the image contents remain essentially unmodified.

In one exemplary embodiment of the method of the invention, all sub-images have the same contour line, which preferably describes a square or a rectangle. The processing is simplified as a result of this measure since the limits of the sub-images coincide with column limits or, respectively, line limits of picture element columns or, respectively, picture element lines.

When the conversion factor between the resolution of the source image and the resolution of the target image is not a whole number, then decisions in determining the target data must be made dependent on at least two source image data. What the method according to the invention achieves is that the decisions can be made by simple logical operations. When the conversion factor amounts, for example, to 2:5, then Boolean operations can be implemented. These operations are simple and can be easily realized with a digital circuit when the image data are binary and, for example, only have the numerical value "0" or "1". What the indicated logical operations particularly achieve is that a diagonal line having the width of one source element is presented in the target image as a diagonal arrangement of picture elements, whereby the target picture elements interconnect.

Another aspect of the invention is directed to a circuit arrangement for processing image data, particularly for the implementation of the method according to the invention or, respectively, embodiments thereof. The aforementioned, advantageous technical effects also apply to the circuit arrangement.

In one exemplary embodiment, the circuit arrangement is utilized in a printer that has a printing unit whose print resolution is prescribed by the arrangement of the printing elements.

Figure 2:
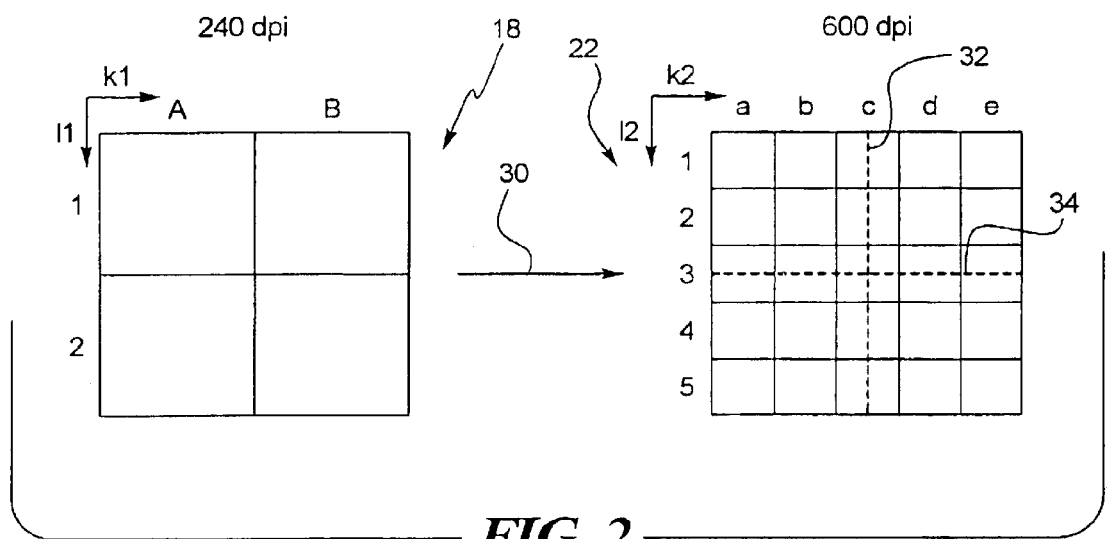
Figure 3:
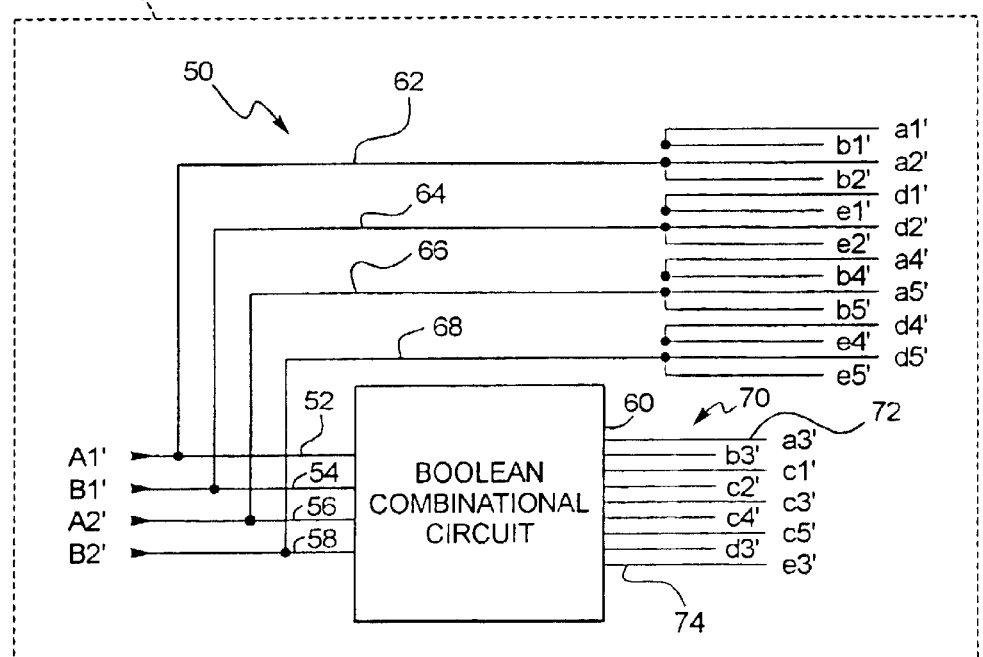
Figure 4:
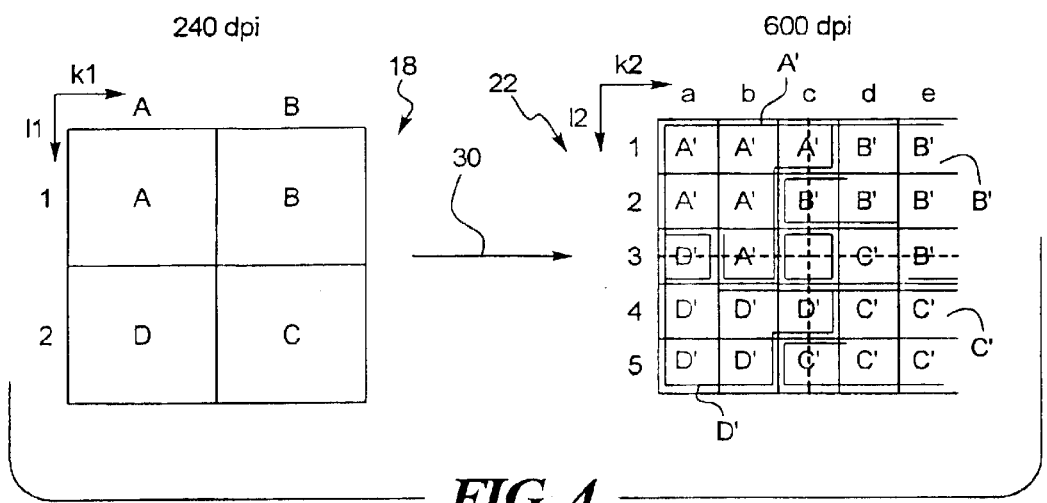
Figure 5:
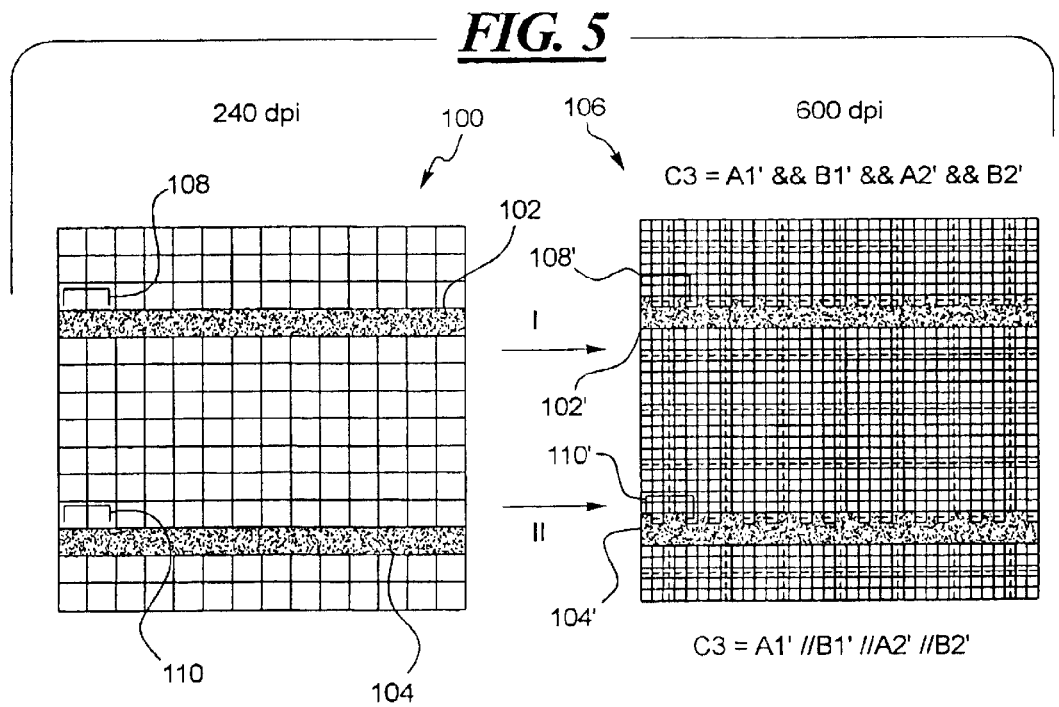
Figure 6:
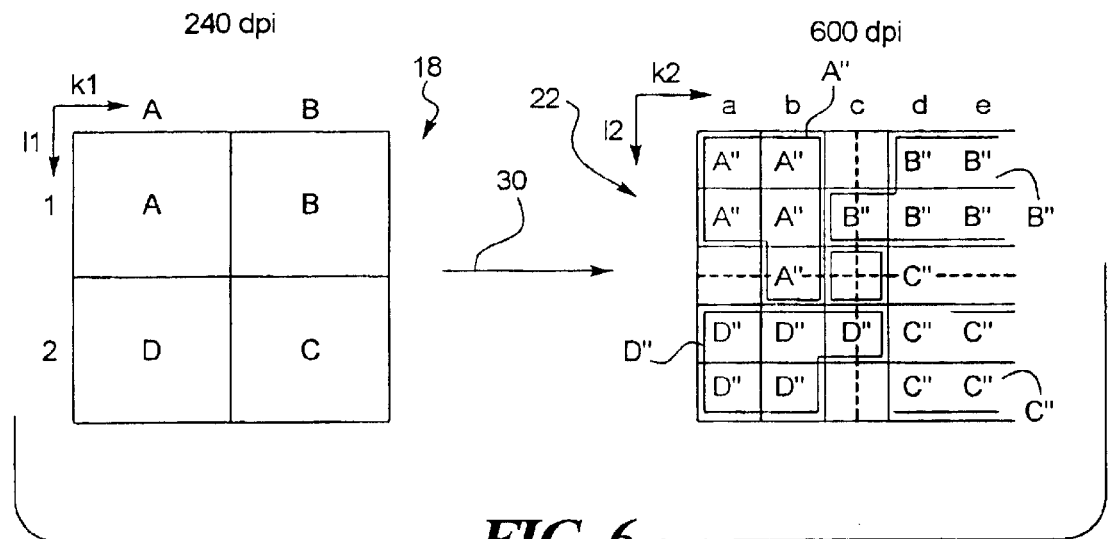
Figure 7:
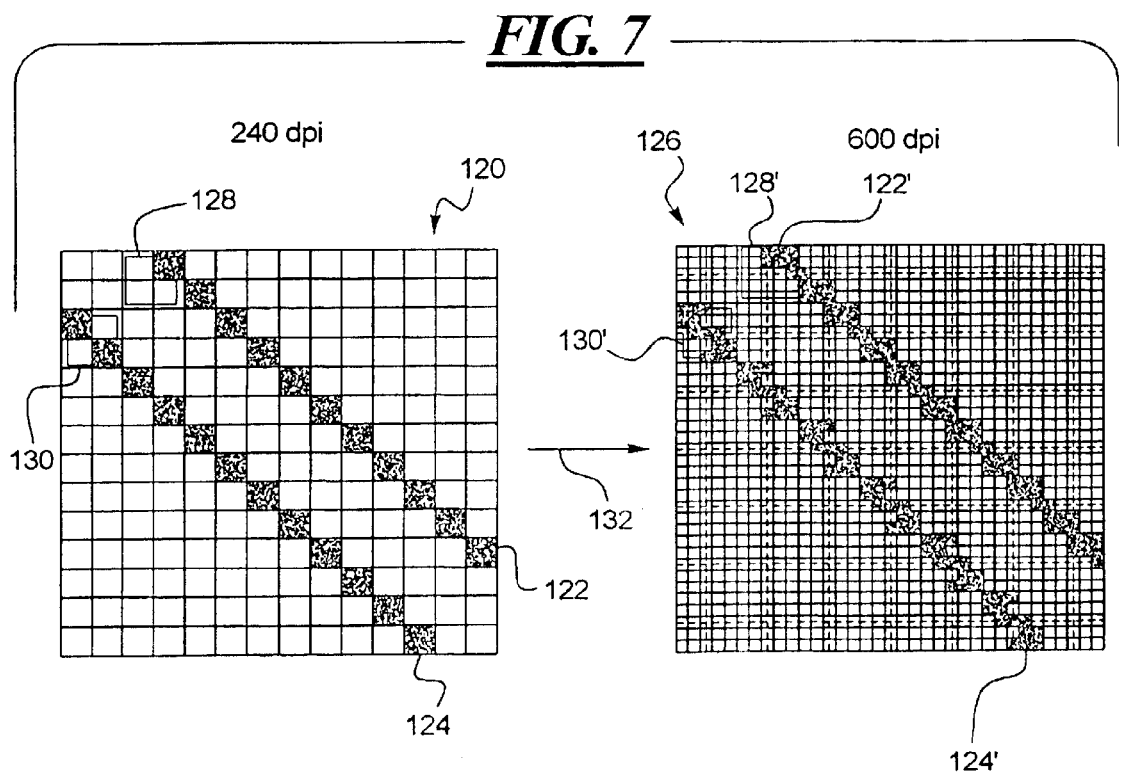
Figure 8:
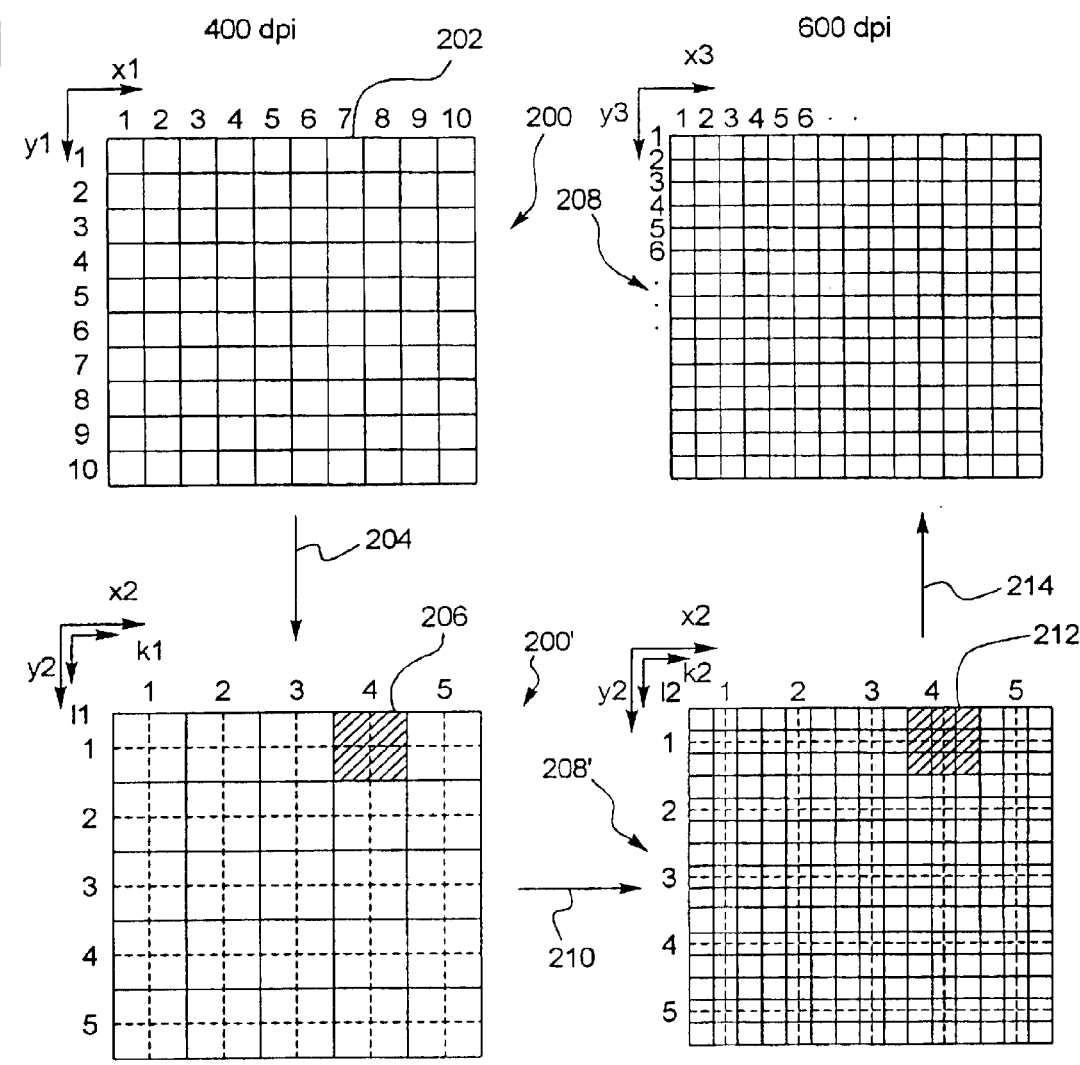
Figure 11:
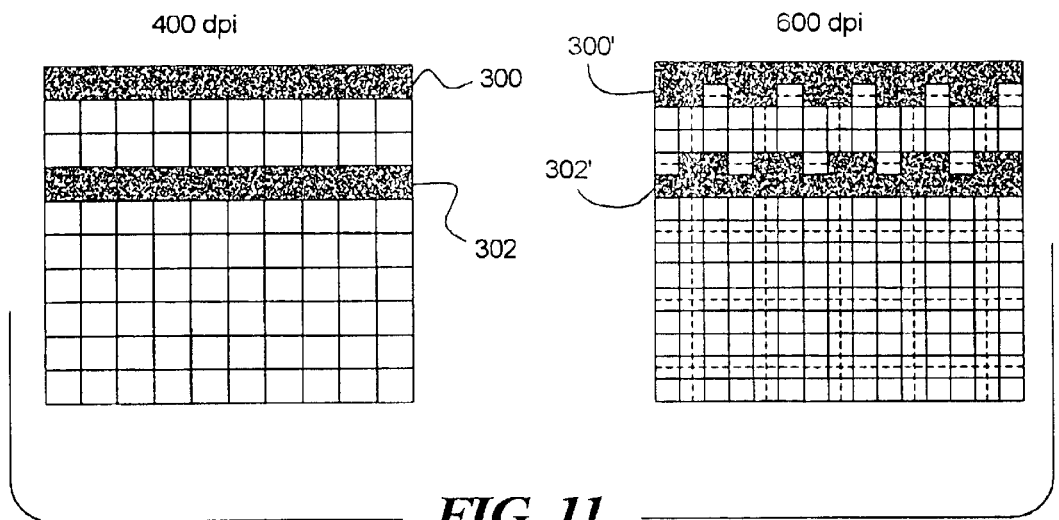
Figure 12:
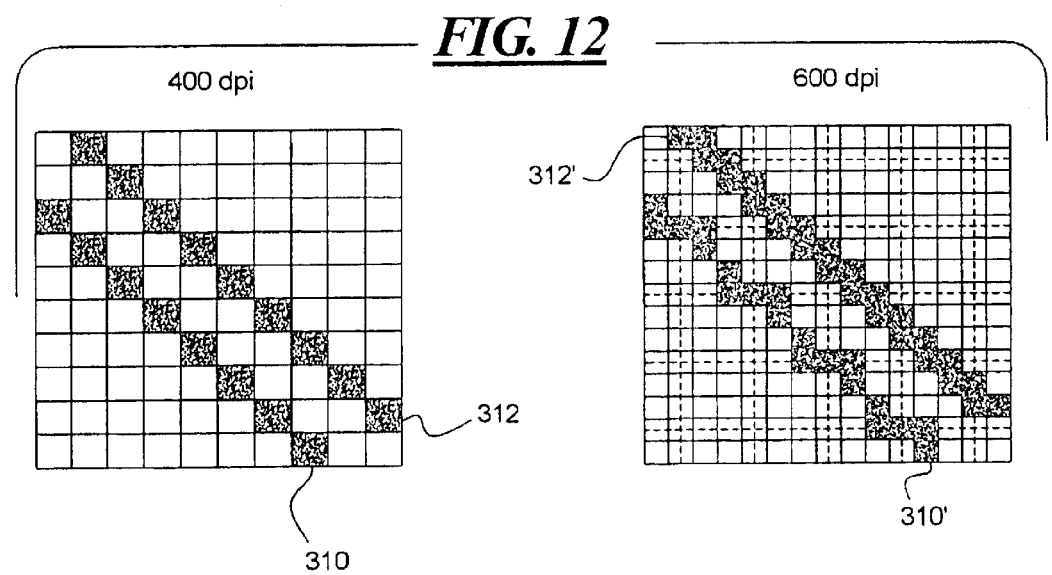
Figure 13:
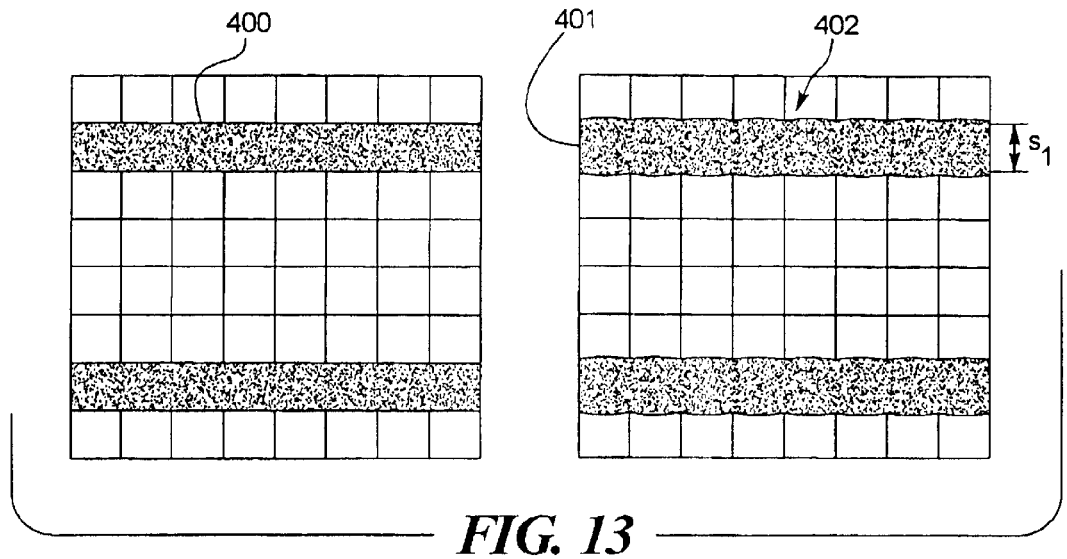
Figure 14:
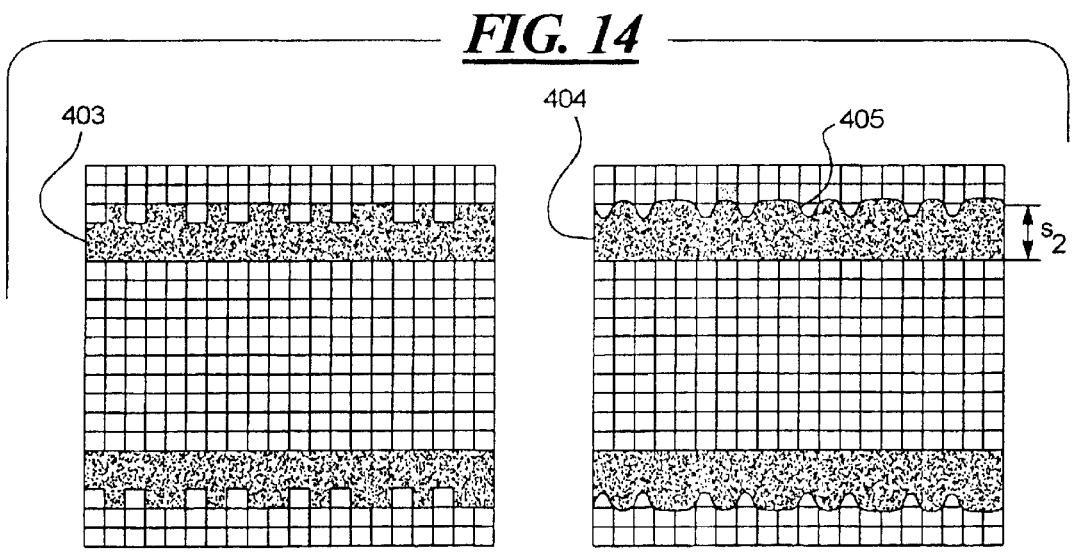

Exemplary embodiments of the invention are explained below with reference to the drawings. Shown therein are:

FIG. 1 two source images having a resolution of 240 dpi and two target images having a resolution of 600 dpi;

FIG. 2 a source sub-image having a resolution of 240 dpi and a target sub-image having a resolution of 600 dpi;

FIG. 3 a circuit arrangement for generating the target image data of a target sub-image with a resolution of 600 dpi from the source image data of a source sub-image having a resolution of 240 dpi;

FIG. 4 a first allocation of sub-areas of a source sub-image having 240 dpi to sub-image of a target sub-image having 600 dpi;

FIG. 5 horizontal lines in a source image having 249 dpi and in a target image having 600 dpi;

FIG. 6 a second allocation of sub-areas of a source sub-image having 240 dpi to sub-areas of a target sub-image having 600 dpi;

FIG. 7 diagonal lines in a source image having 240 dpi and in a target image having 600 dpi;

FIG. 8 two source images having a resolution of 400 dpi and two target images having a resolution of 600 dpi;

FIG. 9 a source sub-image having a resolution of 400 dpi and a target sub-image having a resolution of 600 dpi;

FIG. 10 a circuit arrangement for generating the target image data of a target sub-image with a resolution of 600 dpi from the source image data of a source sub-image having a resolution of 400 dpi;

FIG. 11 horizontal lines in a source image having 400 dpi and in a target image having 600 dpi;

FIG. 12 diagonal lines in a source image having 400 dpi and in a target image having 600 dpi;

FIG. 13 the presentation of a line in a 240 dpi raster that can be achieved with an electrophotographic process; and FIG. 14 the illustration of the line in a 600 dpi given a data processing according to the invention shown in conformity with FIG. 13.

FIG. 1 shows a greatly enlarged source image 10 having a resolution of 240 dpi (picture elements per inch, 1 inch= 25.4 mm). The source image 10 contains quadratic source picture elements Q x1,y1 arranged matrix-like, whereby x1 indicates the column number and y1 indicates the row number of a respective source picture element Q x1,y1. For example, a source picture element 12 is referenced Q 10,1 since it lies in the tenth picture element column and the first picture element row. The resolution is the plurality of source picture elements 12 per 25.4 mm. In its original size, the source image 10 has 240 source picture elements Q x1,y1 per 25.4 mm.

Exactly one source image datum QD x1,y1 is allocated in a memory (not shown) to each source picture element Q x1,y1 of the source image 10, whereby x1 indicates the column number and y1 indicates the row number of the appertaining source picture element Q x1,y1. The source picture element Q 10,1 thus has a source image datum QD 10,1. The presentation of the respectively appertaining source picture element Q x1,y1 is determined by the source picture datum QD x1,y1. A source picture datum QD x1,y1 having the numerical value "0" defines a white source picture element Q x1,y1. A source picture datum QD x1,y1 having the numerical value "1", by contrast, defines a black source picture element Q x1,y1. In the exemplary embodiment of FIG. 1, all source image data QD x1,y1 have the numerical value "0", so that all source picture elements Q x1,y1 are white.

The source image data QD x1,y1 are expediently stored such in the memory cells of the memory that source image data QD x1,y1 for successive source picture elements Q x1,y1 of a row of source picture elements are stored in memory cells with ascending memory addresses, whereby the addresses of memory cells with source image data QD x1,y1 for source picture elements Q x1,y1 of successive rows also have ascending values. The source image data QD x1,y1, however, can also be successively input at a serial interface. In this case, too, a predetermined ordering of the source image data QD x1,y1 is expediently adhered to.

How a target image 14 having a resolution of 600 dpi is generated from the source image 10 is explained below. In a first step, respectively four source picture elements Q x1,y1 forming a square are combined to source sub-images QT x2,y2 arranged matrix-like, whereby x2 indicates the column number of a respective source sub-image QT x2,y2 and y2 indicates the row number of a respective source sub-image QT x2,y2. As indicated by an arrow 16, a source image 10' subdivided into the source images QT x2,y2 arises by combining the source picture elements Q x1,y1. A shaded source sub-image 18 in the source image 10' is also referred to as source sub-image QT 1,1 since it is arranged in the first source sub-image column and the first source sub-image row. The source sub-image 18 contains the four source picture elements Q 1,1, Q 2,1, Q 1,2 and Q 2,2. Edges of source picture elements Q x1,y1 in the source image 10' that do not coincide with edges of source sub-images QT x2,y2 are shown with broken lines. The edges of source picture elements Q x1,y1 that, by contrast, coincide with the edges of source sub-images QT x2,y2 are shown with solid lines.

The determination of the addresses of the source data QD x1,y1 belonging to a source sub-image QT x2,y2 ensues in that the coordinates of the appertaining source elements Q x1,y1 are first identified by counting off or with simple calculating operations proceeding from the coordinates of the processed source sub-image QT x2,y2 being determined according to the following equations (1):

$$x1 = x2 \cdot 2 - 1,\quad (1)$$

$$x1' = (x2 \cdot 2),$$

$$y1 = (y2 \cdot 2) - 1;$$

$$y1' = (y2 \cdot 2),$$

whereby a superscript stroke identifies an alternative. The appertaining source picture elements Q x1,y1, Q x1',y1, Q x1,y1' and Q x 1',y1' or, respectively, the appertaining source image data QD x1,y1, QD x1',y1, QD x1,y1' and QD x1',y1' can be determined for a source sub-image QT x2,y2 with equations (1). When, as explained above, the source image data QD x1,y1 are stored at successive memory cells in the memory, then, proceeding from the identified coordinates, the respective memory cell can be simply calculated when it is known where the first source image datum QD x1,y1 is located in the memory and how many source picture elements are contained in a row of the source image 10.

So that the source image data QD x1,y1 for all source sub-images QT x2,y2 can be further-processed in the same way, the source sub-images QT x2,y2 are viewed as being segregated out of the source image 10'. The source picture elements Q x1,x2 continue to be arranged matrix-like but are referenced by column numbers k1 and row numbers l1 in the segregated matrices that are the same for all source sub-images QT x2,y2. When the column number and the row number are viewed as being coordinates, then the following equations (2) apply:

$$k1 = x1 - (x2 \cdot 2) + 2,\quad (2)$$

$$k1' = x1' - (x2 \cdot 2) + 1,$$

$$l1 = y1 - (y2 \cdot 2) + 2,$$

$$l1' = y1' - (y2 \cdot 2) + 1.$$

In conformity with a calculating rule that is the same for all source sub-images, target image data ZD k2,l2 are calculated from the source image data QD k 1,l1, these defining the presentation of appertaining target picture elements Z k2,l2 that are to be arranged matrix-like in a respective target sub-image ZT x2,y2. k2 thereby indicates the column number and l2 indicates the row number of the target picture elements within a target sub-image ZT x2,y2. The coordinates of a target sub-image ZT x2,y2 coincide with the coordinates of the source sub-image QT x2,y2 whose source image data QD k1,l1 were employed for generating the target image data ZD k2,l2 of the respective target sub-image ZT x2,y2. The target sub-images ZT k2,y2 are thus also arranged matrix-like. As indicated by an arrow 20, a target image 14' arises from the source image 10'.

The source sub-images QT x2,y2 likewise have a resolution of 240 dpi and, as already mentioned, respectively contain four source picture elements Q k1,l1 to which four source image data QD k1,l1 belong. 25 target image data ZD k2,l2 are generated from the four source image data QD k1,l1 of a source sub-image QT x2,y2 according to predetermined calculating rules that are explained below with reference to FIGS. 3 through 7.

Whereas the index k1 or, respectively, l1 only assumes the two values "1" and "2", the index k2 or, respectively, l2 traverses the five numerical values from "1" through "5". The relationship of column number in the source sub-image QT x2,y2 to the column number in the target sub-image ZT x2,y2 thus amounts to 2:5. This ratio is also valid for the relationship of the row number in the source sub-image QT x2,y2 to the row number in the target sub-image ZT x2,y2. A source sub-image QT x2,y2 has the same size as the appertaining source sub-image ZT x2,y2. This leads to the fact that the target picture elements Z k2,12 are smaller than the source picture elements Q k1,l1. The number of target picture elements Z k2,12 per path unit is thus increased in the target image both in column direction as well as in row direction by the ratio 5:2 compared to the source image. It follows therefrom that the target sub-image ZT k2,y2 has a resolution of 600 dpi.

For example, a target sub-image 22 that is also referenced as target sub-image ZT 1,1 is produced from the source sub-image 18 having a resolution of 240 dpi. The limits of target picture elements Z k2,12 in the target image 14' that do not coincide with the limits of target sub-images ZT x2,y2 are shown with thin lines. By contrast, the limits of target picture elements Z k2,12 that coincide with the limits of target sub-images ZT x2,y2 are shown with thicker lines.

In a third step that is illustrated by an arrow 24, a column number x3 or, respectively, row number y3 with respect to the target image 14 is calculated according to equations (3) from the local column number k2 or, respectively, row number 12.

$$X3 = k1 + (k2 - 1) \cdot 5, \quad (3)$$
$$y3 = l1 + (y2 - 1) \cdot 5.$$

The target picture elements Z x3,y3 are in turn arranged matrix-like in the target image 14. One target picture element 26 is located in the tenth column and the first row of the target image 14 and is thus referenced as target picture element Z 10,1. The target image data ZD x3,y3 of the target image can be uniformly accessed since an address under which the target image datum ZD x3,y3 is stored for the further-processing can be calculated for each target datum ZD x3,y3 from the column number x3 and the row number y3 according to a simple, predetermined rule.

The left side of FIG. 2 shows another enlargement of the source sub-image 18 that has a resolution of 240 dpi. The right-hand side shows the target sub-image 22 that has a resolution of 600 dpi. An arrow 30 illustrates the transition from the source sub-image 16 with 240 dpi to the target sub-image 22 with 600 dpi.

In agreement with that stated above, the source sub-image 18 contains the picture elements Q A1, and Q B1 in the uppermost row from left to right, whereby, however, the column numbers k1 are replaced by upper case letters that enable an unambiguous short designation. The two picture elements in the row lying therebelow are called Q A,2 and Q B,2. The shortened designation A1, B1, A2 and B2 is employed below for the picture elements in a source sub-image, for example 18.

Enumerated line-by-line from top to bottom as well as from left to right within a line, the target sub-image 22 contains the target picture elements Z a,1 through Z e,1; Z a,2 through Z e,2; Z a,3 through Z e,3; Z a,4 through Z e,4 as well as Z a,5 through Z e,5, whereby, however, the column numbers k2 are replaced by lower case letters. The short designation, i.e. a1 through e5 is also employed below for these target picture elements.

A vertical dashed line 32 and a horizontal dashed line 34 illustrated edges of the source picture elements A1 through B2 that, given a mental coverage of the target sub-image 22 with the source sub-image 18, are covered by a plurality of source picture elements A1 through B2.

An abbreviated designation is also employed below for the source image data QD A,1 through QD B,2 of a source sub-image QT x2,y2. In order to be distinguished from the appertaining source picture elements A1 through B2, the source image data are thereby followed by a prime. In the indicated sequence, thus, source image data A1', B1', A2' or, respectively, B2' belong to the picture elements A1, B1, A or, respectively, B2. In the same way, the abbreviated notation a1' through e5' is employed for the target image data ZD a,1 through ZD e,5. The target image data a1' through e5' thus belong to the target picture elements a1 through e5 of the target sub-image 22.

FIG. 3 shows a circuit arrangement 50 that generates the target image data a1' through e5' of the target sub-image 22 (see FIG. 2) with 600 dpi from the source image data A1', B1', A2' and B2' of the source sub-image 18 (see FIG. 2). FIG. 2 is also referenced below when explaining FIG. 3. The source image data A1', B1', A2' or, respectively, B2' are input in this sequence into a circuit block 60 at input lines 52, 54, 56 or, respectively, 58.

The circuit arrangement 50 must generate the target image data a1' through e5' from the source image data A1', B1', A2' and B2' such that the arising source sub-image 22 reproduces the same image contents insofar as possible as the source sub-image 18—but with a higher resolution. This procedure is not critical for the target picture elements that, given the mental superimposition of source sub-image 18 and target sub-image 22, are only covered by one of the source picture elements A1, B1, A2 and B2, see FIG. 2. These are the target picture elements a1, b1, a2, b2, d1, e1, d2, e2, a4, b4, a5, b5, d4, e4, d5 and e5. In order to obtain the image contents for these source picture elements, each of these target picture elements must merely be presented like the source picture element A1 through B4 with which it is covered in the mental superimposition. This means that the source picture datum A1' through B2' of that source picture element A1 through B2 that covers the corresponding target picture element in the mental superimposition is to be copied for generating the target image data of said target picture elements, i.e. for example the source image datum A1' for the target image data a1', b1', a2' and b2'. The logical operation of identity is thus employed for generating these target image data. This operation is realized in a circuit by directly through-connected lines 62 through 68.

The source image datum A1' is transmitted via the line 62 and is output as target image datum a1', b1', a2' or, respectively, b2' via line branches of the line 62. When the upper left hand corner of the source sub-image 18 of FIG. 2 has a black source picture element A1, then the four target picture elements a1, b1, a2 and b2 are likewise presented black in the target sub-image 22. The image content or, respectively, the image information of the upper left corner of the source sub-image 16 is, accordingly, reproduced with enhanced resolution in the upper left hand corner region of the target sub-image 22.

The source image datum B1' is taken as target image datum d1', e1', d2' or, respectively, e2' via the line 64, so that the image information of the upper right hand corner of the source sub-image 18 is reproduced in the upper right hand corner of the target sub-image 22, also see FIG. 2. In a similar way, the source image datum A2' is output as target image datum a4', b4', a5' and b5' or, respectively, the source image datum B2' is output as target image datum d4', e4', d5' and e5' with the line 66 or, respectively, 68.

The increase in the resolution is more difficult when, in the mental superimposition of the source sub-image 18 and the target sub-image 22, target picture elements are covered by two or more source picture elements. The dashed lines 32 and 34 proceed through such target picture elements a3, b3, c1 through c5, d3 and e3. When one of the covering source picture elements A1 through B4 is white and when another source picture element A1 through B4 covering the same target picture element is black, i.e. the numerical value of the appertaining source image data also differ, then a decision must be made as to how the appertaining target picture datum is to be calculated. A decision, by contrast, is simple when the source picture elements A1 through B2 covering a target picture element are all white or all black and, thus, their source image data A1' through B2' also have the same numerical value. In this case, one of the numerical values of the source image data must merely be taken as value for the appertaining target image datum.

The target image data a3', b3', c1' through c5', d3' and e3' belonging to the target picture elements a3, b3, c1 through c5, d3 and e3 are generated in the circuit block 60, whereby said decision is respectively made. The circuit block 60 has the four input lines 52, 54, 56 or, respectively, 58 for inputting the source image data A1', B1', A2' or, respectively, B2'. Logical operations are implemented in the circuit block 60 with the source image data A1', B1', A2' and B2', these being explained below with reference to FIGS. 4 and 5 or, respectively, on the basis of FIGS. 6 and 7 for another exemplary embodiment. The target image data a3', b3', c1' through c5', d3' and e3' arising in these logical operations are then output on output lines of an output bus 70. For example, the image datum a3' is output on an output line 72, and the image data e3' is output on an output line 74.

When generating the target image 10 according to FIG. 1 with increased resolution, a plurality of identical circuit arrangements 50 are expediently employed, these simultaneously generating a plurality of target sub-images with increased resolution. As a result of this measure, the circuit outlay is in fact somewhat increased, but the time for generating all target images ZT x2,y2 and, thus, the target image 14 (see FIG. 1) is substantially reduced.

FIG. 4 shows a first allocation of sub-areas A through D of the source sub-image 18 to sub-areas A' through D' of the target sub-image 22 in a first version for producing the target image data at the output of the circuit arrangement 50, see FIG. 2. A principal demand in the conversion of a source image or, respectively, of a source sub-image into a target image or, respectively, target sub-image with higher resolution is that no falsification occurs in the reproduction of lines, for example a different line width in the source image and in the target image. Particularly deriving therefrom for the conversion of the resolution from 240 dpi to 600 dpi is the demand that lines to be reproduced having the line width of one picture element in the source sub-image must be presented by lines having the width 2.5 target picture elements. Picture elements, however, are the smallest displayable unit, so that it is not possible to present only a part of picture element, for example only half. One solution is offered by the intentional omission of picture elements at the edge of a line in the target sub-image. As a result of this measure, the line is "thinned" at its edge. For explaining this "thinning" of horizontal and vertical lines, the quadratic sub-areas that are covered by the source picture elements A1, B1, B2 or, respectively, A2 are referenced A, B, C, or, respectively, D in this sequence.

The sub-areas A', B', C' and D' that are respectively formed by target picture elements correspond in this sequence in the target sub-image 22 to the sub-areas A, B, C, and D. Respectively four target picture elements forming a square are allocated to the sub-area A', B', C' or, respectively, D' in the four corner areas of the target sub-image 22, this lying in the corner under consideration in the target sub-image 22. For example, the target picture elements a1, b1, a2 and b2 are allocated to the sub-area A'. As already mentioned, this allocation is a consequence of the demand to increase the resolution to such an extent that the image contents remain essentially unmodified.

Additionally, the area A' also contains the target picture elements c1 and b3. As a result thereof, the area A' —by contrast to the corresponding area A—is not quadratic but has projections similar to a jigsaw puzzle part. The surface region B' continues to additionally contain the target picture elements c2 and e3 in addition to the target picture elements d1, d2, e1 and e2. The surface area C' contains the target picture elements d3 and c5 in addition to the target picture elements d4, e4, d5 and e5 that form a square. The surface area D' contains the target picture elements a3 and c4 in addition to the target picture elements a4, b4, a5 and b5.

The surface areas A' through D' have the same asymmetrical contour. However, the surface areas A1 through D' are respectively arranged rotated by 90° relative to one another when they are viewed in this sequence. Due to the rotation of the surface areas A' through D', a nearly complete coverage of the area of the target sub-image 22 by the surface areas A' through D' likewise arises in the fashion of a puzzle. Only the surface area of the target picture element c3 forms an exception. The target picture elements of the respective surface areas A' through D' are presented like the respective surface element A through D. To that end, only the logical operation of identity is required, this being realized by direct line connections. In a simplified circuit block (not shown), thus, only the target image datum c3' is thus calculated.

When, for example, the surface elements A and B in the source sub-image 18 are a component of a horizontal black line, then the target picture elements a1 through e1, a2 through e2, b2, b3 and e3 belonging to the surface areas A' and B' in the target sub-image 22 are displayed black. The horizontal line that thus arises is thinned at its lower edge since at least the picture element a3 and the picture element d3 are presented white. Similarly, a horizontal line is also thinned that contains the surface areas D and C in the source sub-image 18. When the source sub-image 18 contains a vertical line for whose presentation the surface areas A and D are black in the source sub-image 18, then the picture elements a1 through a5, b1 through b5, c1 and c4 or, respectively, the surface areas A' and D' are presented black in the target sub-image 22. The vertical line is likewise thinned since the picture element c2 and the picture element c5 as well as the picture elements d1 through d5 and e1 through e5 are presented white. In a similar way, a vertical line that contains the surface areas B and C in the source sub-image 16 is thinned.

FIG. 5 shows a source image 100 with a resolution of 240 dpi that contains a respective, horizontal black line 102 or, respectively, 104 in the fourth and in the twelfth row. Both lines 102 and 104 have the width of one picture element. In the conversion of the horizontal line 102 into the higher resolution of 600 dpi with a first version I, a line 102' with a tine-like, upper edge arises in a target image 106. Each source sub-image QT x2,y2 of the source image 100 is thereby processed on the basis of the method explained in FIG. 4, thus, for example, a source sub-image 108. FIG. 4 is also referenced below. A target sub-image 108' generated from the source sub-image 108 has black surface areas C' and D'. The tines between which the line 102' is thinned arise on the line 102' due to the blackening of the target picture elements a3 and d3. The target image datum c3' belonging to the target picture element c3 of each and every target sub-image ZT x2,y2 is calculated in the circuit block 60 according to FIG. 3 in conformity with the following equation (4):

$$c3'=A1'\&\& B1'\&\& A2'\&\& B2', \quad (4)$$

whereby A1', B1', A2' and B2' are the source image data of the source picture elements of the processed source sub-image UT x2,y2 that has the same position in the source image 100 as the target sub-image produced at the moment has in the target image 106. For the target sub-image 108', thus, the source image data QD 1,3, QD 2,3, QD 1,4 and QD 2,4 belonging to the picture elements of the source sub-image 108. The character "&&" in equation (4) denotes a logical AND operation in conformity with programming language C. The target image datum c3' contains only the numerical value "1" when all source image data A1', B1', A2' and B2' cited in equation (4) likewise have the numerical value "1". In all other instances, the target image datum c3' has the numerical value "0", so that the appertaining target picture element c3 is presented white.

Given a second version II, a horizontal line 104' whose upper edge is likewise fashioned tine-like but deviates from the tine-like edge of the line 102' arises from the line 104 in the source image 100 in the conversion into the higher resolution of 600 dpi. This can be explained in that the target image datum c3' of the central target picture element c3 of each target sub-image ZT x2,y2 is calculated according to the following equation (5) in version II:

$$c3'=A1'|B1'||A2'||B2', \quad (5)$$

whereby A1', B1', A2' and B2' are again the source image data of the source sub-image QT x2,y2 at a position in the source image 100 that coincides with the position of the generated target sub-image ZT x2,y2 in the target image 106. These are the source image data QD 1,11, QD 2,11, QD 1,12 and QD 2,12 for a source sub-image 110, whereby the target sub-image under consideration is a target sub-image 110'. Based on the programming language C, the character "||" again indicates the logical OR operation. The target image datum c3' thus contains the numerical value "1" as soon as at least one source image datum A1', B1', A2' or B2' has the numerical value "1".

As can be derived from FIG. 5, a tine structure is presented instead of a continuous black stroke when thinning a line. In terms of data orientation, this corresponds to the periodic conversion of binary data, particularly the conversion of ones ("black picture element") into zeroes ("white picture element"). In the example shown in FIG. 5, the tine structure of the lines 102' and 104' has a periodicity of five, i.e. twice the conversion factor of 2.5. The thinning of the lines 102' and 104' effected by the tine structure thus ensues with a periodicity that is a whole multiple of the conversion factor. The two lines 102' and 104' only differ in that their tine structure is inverse.

For the viewer of a corresponding print out, the tine structure of the lines 102' and 104' in the 600 dpi raster generated with the two methods I and II can practically not be distinguished from the original line printed in the 240 dpi raster. Due to the limited resolution of the human eye, the tine structure in the extremely fine 600 dpi grid is practically not perceived by the eye. The eye integrates over the registered tine structure, as a result whereof the impression of half a line width arises.

FIG. 6 shows a second allocation of sub-areas A through D of the source sub-image 18 to sub-areas "A through D" of the target sub-image 22. In addition to the correct reproduction of horizontal and vertical lines, slanting lines and slanting contours should also not be too greatly falsified in the conversion into the higher resolution. Given slanting lines or, respectively, contours, graduations of the contained picture elements occur. The highest demands with respect to low falsification derive given lines having a width of one picture element and a slope of 45°. FIG. 7, which is explained in detail later, shows two such diagonal lines 122 and 124 in a source image 120.

The surface areas of the picture elements A1, B1, B2 and A2 are again referenced A, B, C and D in this sequence. Surface areas of target picture elements that can be allocated to the respective surface areas A, B, C or D are identified in the target sub-image 22 as corresponding surface areas A", B", C" or, respectively, D". The surface areas A', B", C" and D" respectively have five target picture elements and coincide in contour. However, the surface areas A", B", C" and D" are respectively rotated by 90° relative to one another in this sequence. The target picture element a3, c1, c3, c5 and e3 are not allocated to any of the surface areas A" through D". The calculation of the target image data a3', c1', c3', c5' and e3' is as can be seen from the equations (6) indicated below.

The target image data a1' through e5' of each target sub-image ZT x2,y2 or, respectively, ZT k2,l2 are calculated according to the following equations (6) in the exemplary embodiment with the second allocation:

a1'=A1', a2'=A1', b1'=A1', b2'=A1', b3'=A1',
c2'=B1', d1'=B1', d2'=B1', e1'=B1', e2'=B1',
a4'=A2', a5'=A2', b4'=A2', b5'=A2', c4'=A2',
d3'=B2', d4'=B2', d5'=B2', e4'=B2', e5'=B2',
a3'=A2'||A1'&&(!B1'||!A2'||!B2')
c1'=A1'||B1'&&(!A1'&&!A'"&&!B2')
c3'=(A1'&&B1')||(A1'&&A2')||(A1'&&B2')||(B1'&&A2')
||(B1'&&&B2')||(A2'&&B2')
c5'=B2'||A2'&&(!A1'&&!B1'&&!B2')
e3'=B1'||B2'&&(!A1'&&!B1'&&!A2')

In agreement with that stated above, it is thereby valid for the operators "||" and "&&" that the operator "||" indicates the OR operation and the operator "&&" indicates the AND operation. The operator "!"—in conformity with the programming language C, indicates the logical negation of the immediately following source image datum. The logical value "0" becomes the logical value "1" by negation and vice versa. With respect to the implementation sequence of the calculating operations referenced by the operators "||", "&&" as well as "!", what is valid is that the negations are implemented first, then the AND operations and the OR operation at the end.

FIG. 7 shows the diagonal lines 122 and 124 in the source image 120 with 240 dpi and diagonal line structures 122' and 124' in a target image 126 which is generated from the source image 120, as indicated by an arrow 132. When generating the target image 126 from the source image 120, the diagonal line structure 122' is generated from the diagonal line 122, and a diagonal line structure 124' is generated from the diagonal line 124. The two diagonal line structures 122' and 124' are in fact essentially diagonal lines but have a structure deviating from one another.

When a source sub-image 128 is considered, then a target sub-image 128' arises therefrom when generating the target image 126 with the resolution of 600 dpi increased compared to 240 dpi. Only the picture element in the upper right hand corner is black in the source sub-image 128. By contrast thereto, the picture elements in the upper left corner and the lower right corner are black in the source sub-image 130. This difference between the source sub-image 128 and 130 is the reason that the generated source sub-images 128' and 130' deviate from one another in the illustrated way when application of the aforementioned equations (6).

In another exemplary embodiment, the following equations (6') are employed instead of the equations (6):

a1'=A1', a2'=A1', b1'=A1', b2'=A1',
d1'=B1', d2'=B1', e1'=B1', e2'=B1',
a4'=A2', a5'=A2', b4'=A2', b5'=A2',
d4'=B2', d5'=B2', e4'=B2', e5'=B2',
c1'=A1'&&B1'||B1'&&!A2'||A1&&!B2'
c2'=A1'&&B1'||A1'&&B2'||B'&&A2'
a3'=A1'&&A2)||A1'&&!B2'||!B1'&&A2'
b3'=A1'&&B2'||A1'&&A2'||B1'&&A2'
c3' =
  A1'&&B1'||A1'&&A2'||A1'&&B2'||B1'&&A2'||B1'&-&B2'||A2'&&B2'
d3'=A1'&&B2'||B1'&&A2'||B1"&&B2'
e3'=!A1&&B2'||B1'&&!A2'||B1'&&B2'
c4'=A1'&& B2'||B1'&&A2'||A2'&&B2'
c5'=!A1'&&B2'||!B1&&A2'||A2'&&B2', whereby the operators "||" and "&&" and "!" reference the OR operation, the AND operation and the logical negation, in this sequence. The image contents of the source image are reproduced without significant falsifications in the target image with equations (6').

FIG. 8 shows a greatly enlarged source image 200 having a resolution of 400 dpi. The source image 200 contains quadratic source picture elements Q x1,y1 arranged matrix-like, whereby x1 indicates the column number and y2 indicates the row number of a respective source picture element Q x1,x2. For example, a source picture element 202 is also referenced Q 7,1 since it is arranged in the seventh column and the first row of the source image 200. A source image datum QD x1,y1 (not shown) is allocated to each source picture element Q x1,y1. When a source image datum QD x1,y1 has the numerical value "0", then the appertaining source picture element Q x1,y1 is white. When, by contrast, a source image datum QD x1,y1 has the numerical value "1", then the appertaining source picture element Q x1,y1 is black.

How a target image 208 having a resolution of 600 dpi is generated from the source image 200 is explained on the basis of FIGS. 8 through 12. In a first step, respectively four source picture elements Q x1,y1 of the source image 200 forming a square are again combined to form source sub-images QT x2,y2 arranged matrix-like. x2 is thereby the column number of a respective source sub-image QT x2,y2, and y2 is the row number of a respective source sub-image QT x2,y2 in a source image 200'.

The source image 200' arises, as indicated by an arrow 204, by the combination of the source picture elements Q x1,y1 to form the source sub-images QT x2,y2. Compared to the source image 200, the source image 200' is subdivided into source sub-images QT x2,y2. A shaded source sub-image 206 contains the source picture elements Q 6,1, Q 7,1, Q 6,2 and Q 7,2. The source sub-image 206 is also referred to as source sub-image QT 4,1. The boundaries of the source picture elements Q x1,y1, which do not coincide with the boundaries of the source sub-images QT x2,y2, are shown by dashed lines in the source image 200'.

The relationship of the column numbers x1 or, respectively, of the row numbers y1 in the source image 200 and of the source sub-image column number x2 or, respectively, the source sub-image row number y2 is produced by the aforementioned equations (1). When processing the source sub-images QT x2,y2, these are in turn viewed as being segregated from the source image 200'. The source picture elements Q x1,x2 [sic] thus continue to be arranged matrix-shaped but are referenced by the same column numbers k1 or, respectively, row numbers 11 for all source sub-images QT x2,y2. The aforementioned equations (2) thereby continue to apply.

Destination image data ZD k2,12 that determine the presentation of appertaining destination picture elements Z k2,12 are subsequently calculated from the respective source image data QD k1,11 for all source sub-images QT x2,y2 according to an identical calculating rule. The target picture elements Z k2,12 are to be arranged matrix-like in target sub-images ZT x2,y2. K2 thereby indicates the column number and 12 indicates the line numbers of the target picture elements Z k2,12 in the respective target sub-image ZT x2,y2. The target image data ZD k2,12 have either the numerical value "0" for white or "1" for black. The column numbers x2 or, respectively, the line numbers y2 of the source sub-images QT x2,y2 agree with the column numbers x2 or, respectively, the row numbers y2 of the target sub-images ZT x2,y2. The target sub-images ZT x2,y2 are thus also arranged matrix-like.

As indicated by an arrow 210, a target image 208' arises from the source image 200'. For example, a target sub-image 212 having a resolution of 600 dpi is generated from the source sub-image 206 having the resolution of 400 dpi. Whereas the source sub-image 206 contains four source picture elements, nine target picture elements are contained in the target sub-image 212. The source sub-image 206 is of exactly the same size as the target sub-image 212. The ratio of the number of source picture elements in the source image 206 to the number of target picture elements in the target image 212 thus amounts to 2:3. This corresponds to an increase of the resolution both in row direction as well as in column direction from 400 dpi to 600 dpi. The limits of target picture elements Z k2,12 that do not coincide with the limits of target sub-images ZT x2,y2 in the target image 208' are shown with thin lines. Dashed lines proceed through target picture elements Z k2,12 that are covered by more than one source picture element Q x1,y1 in the mental superimposition of the source image 200' onto the target image 208'.

In a third step, which is illustrated by an arrow 214, column numbers x3 and row numbers y3 with respect to the target image 208 are calculated from the local column numbers k2 or, respectively, row numbers 12 according to the following equations (7):

$$x3 = k1 + (x2-1) \cdot 3$$

$$y3 = 11 + (y2-1) \cdot 3 \quad (7)$$

The target picture elements Z x3,y3 are again arranged matrix-like in the target image 208. As a result of the column number x3 or, respectively, the row numbers y3, further processing of the target picture elements Z x3,y3 or, respectively, of the appertaining target image data ZD x3,y3 is simplified. As a result of the processing, the target image 208 having the resolution of 600 dpi arises due to the positionally correct joining of the target sub-images ZT x2,y2.

The left-hand side of FIG. 9 shows an enlargement of the source sub-image 206 with 400 dpi. An arrow 220 illustrates the transition from the source sub-image 206 to the target sub-image 212 that is shown in the right-hand part of FIG. 9 and that has a resolution of 600 dpi. Below, the abbreviated notation is employed for referencing the source picture elements Q k1,11 and the source image data QD x1,11 in the source sub-image 206 as well as for referencing the target picture elements Z k2,12 and the target image data ZD k2,12 in the target sub-image 212. The source picture elements are therefore referred to as A1 through B2, and the source image data are referenced a1' through b2'. The designation picture elements are referenced a1 through c2, and the target image data are referenced as a1' through c3'.

FIG. 10 shows a circuit arrangement 248 for increasing the resolution from 400 dpi in the source sub-image 206 to 600 dpi in the target sub-image 212. FIG. 9 is therefore also referred to when explaining FIG. 10. With lines 250, 252, 254 or, respectively, 256, the source image data A1', B1', C1' or, respectively, D1' are input into a circuit block 260. A line 250' branches off from the line 250, so that the source image datum A1' is transferred past the circuit block 260 with the line 250' as target image datum a1'. The line 250' thus realizes the logical operation of identity. Likewise, a line 252', 254' or, respectively, 256' branches off from the line 252, 254 or, respectively, 256. The line 252' serves the purpose of transferring the source image datum B1' as target image datum c1'. The source image datum A2' or, respectively, B2' is copied as target image datum a3' or, respectively, c3' with the line 254' or, respectively, 256'.

The circuit block 260 has five output lines 270 through 278 on which a respective target image datum a2', b1', b2', b3' or, respectively, c2' is output. The target image data a1', a2', b1' through b3' and c2' are calculated in the circuit block 250 according to the following equations (8):

a1'=A1', c1'=B1', a3'=A2', c3'=B2' a2'=A1'||A2'&&(!A1'&&!B1'&&!B2')

b1'=B1'||A1'&&(!B1'&&!A2'&&!B2')

b2'=(A1'&&B1')||(A1'&&A2')||(A1'&&B2')||(B1'&&A2') ||(B1'&&B2')||(A2'&& B2')

b3'=A2'||B2'&&(!A1'&&!B1'&!A2')

c2'=B2'||B1'&&(!A1'&&!A2'&&!B2')

whereby the operators "||" "&&" and "!"—in this sequence—again reference OR operation, the AND operation and the logical negation.

For example, the target image datum a2' is given the numerical value "1" (black) when at least the source picture element A1 is black or when only the source picture element A2' is black. The target image datum b2' is given the numerical value "1" only when at least two source picture elements in a source sub-image have the numerical value "1" (black).

FIG. 11 shows an example for raising the resolution from 400 dpi to 600 dpi with the aforementioned equations (8). Horizontal lines 300 and 302 having a line width of respectively one black picture element become horizontal lines 300' or, respectively, 302' that have a thinned edge at respectively one side.

FIG. 7 shows the enhancement of the resolution from 400 dpi to 600 dpi for diagonal lines 31 and 312. The aforementioned equations (8) as well as the circuit arrangement according to FIG. 10 are thereby likewise employed. The diagonal line 310 becomes a diagonal line structure 310'. A somewhat different line structure 312' arises from the line 312. The reasons for the deviation of the line structures 310' and 312' from one another are the same as were indicated above for the diagonal line structures 122' and 124' (see FIG. 7). Both line structures 310' and 312' are interconnected structures with respect to the black target picture elements Z x3,y3.

FIG. 13 again shows a line 400 in a 240 dpi raster greatly enlarged. This line corresponds to the line 102 of FIG. 5. When it is illuminated and developed and an electrophotographic printer, for example with light emitting diodes (LEDs) point-by-point on the photoconductor drum in a 240 dpi raster, then the line 401 arises on the recording medium (paper) as a result of the electrophotographic process. The effect of the recording process is that the line 401 is wavy at its edge 402. Since the human eye has a limited resolution, it averages over the wave structure when viewing the line 401 and perceives the line width $s_1$. FIG. 14 illustrates how the line 400 is presented in a 600 dpi raster according to the invention. The data of the structure 403 (600 dpi) are thereby generated from the image data of the line 400 (240 dpi). When these data are reproduced on an electrophotographic printer with 600 dpi resolution, then the structure 404 with wavy edges 405 arises. When viewing this structure 404, the human eye likewise averages over the waves, as a result whereof the line width $s_2$ is perceived. Given a suitable selection of the periodicity, $s_1=s_2$ applies.

The method for modifying the resolution is also utilized for modifying the size of the target image compared to the size of the source images. In this case, target picture elements and source picture elements are of the same size. The method steps, however, remain the same.

LIST OF REFERENCE CHARACTERS

| | |
|---|---|
| 10, 10' | source image |
| 12 | source picture element |
| Q x1, x2 | source picture element |
| QD x1, x2 | source image datum |
| QT x1, x2 | source sub-image |
| 14, 14' | target image |
| 16 | arrow |
| 18 | source sub-image |
| Q k1, l1 | source picture element |
| QD k1, l1 | source image datum |
| ZD k2, l2 | target image datum |
| Z k2, l2 | target picture element |
| ZT x2, y2 | target sub-image |
| 22 | target sub-image |
| 24 | arrow |
| 26 | target image |
| 30 | arrow |
| 32, 34 | dashed line |
| A1 through B2 | corresponds to QA, 1 through Q B2 |
| a1 through e5 | corresponds to Z a1, through Z e5 |
| A1' through B2' | corresponds to QD A1, through QD B, 2 |
| a1' through e5' | corresponds to ZD a, 1 through ZD e5 |
| 50 | circuit arrangement |
| 52 through 58 | input line |
| 60 | circuit block |
| 62 through 68 | line |
| 70 | output buses |
| 72, 74 | output line |
| A through D | surface area (source sub-image) |
| A' through D' | surface area (target sub-image) |
| 100 | source image |
| 102, 104 | horizontal line |
| I | first version |
| II | second version |
| 102', 104' | line with tine-like edge |
| 106 | target image |
| 108 | source sub-image |
| 108' | target sub-image |
| 110 | source sub-image |
| 110' | target sub-image |
| 120 | source image |
| 122, 124 | diagonal line |
| 122', 124' | diagonal line structure |
| 126 | target image |
| 128 | source sub-image |
| 128' | target sub-image |
| 130 | source sub-image |
| 130' | target sub-image |
| 132 | arrow |
| 200, 200' | source image |
| 202 | source picture element |
| 204 | arrow |

-continued

| | |
|---|---|
| 206 | source sub-image |
| 208, 208' | target image |
| 210 | arrow |
| 212 | target sub-image |
| 214 | arrow |
| 220 | arrow |
| 248 | circuit arrangement |
| 250 through 256 | line |
| 260 | circuit block |
| 250' through 256' | line |
| 270 through 280 | line |
| 300, 302 | horizontal line |
| 302 | horizontal line |
| 300', 302' | horizontal line structure |
| 310, 312 | diagonal line |
| 310', 312' | diagonal line structure |
| 400 | line in the 240 dpi raster |
| 401 | reproduced line in the 240 dpi raster |
| 402, 405 | wave structure |
| 403 | thinned line in the 600 dpi raster |
| 404 | reproduced structure in the 600 dpi raster |

What is claimed is:

1. A method for processing image data, comprising the steps of:

defining a presentation of respective source picture elements by a source image to be processed that contains source picture elements arranged matrix-like to which respective source image data is allocated;

determining a presentation of respective target picture elements by a target image arising in processing that contains target picture elements arranged matrix-like to which respective target image data is allocated;

the source image having a first resolution corresponding to a source raster and the target image having a second resolution deviating from the first resolution and different by a conversion factor that corresponds to a target raster, said target image has a higher resolution than said source image, said source image and said target image being binary images;

subdividing the source image into source sub-images arranged matrix-like;

arranging a respective target sub-image at a position in the target image that coincides with a position of the appertaining source sub-image in the source image; and performing a conversion such that a line having a non-whole-numbered line width is presented in the target raster in that it is thinned in the target raster.

2. A method according to claim 1, wherein a line having a non-whole-numbered line width is thinned in a destination raster with a whole-numbered periodicity, said whole-numbered periodicity being a whole multiple of the conversion factor.

3. A method according to claim 1, further comprising the step of:

given a conversion of the image data by a conversion factor of 2.5, presenting half a line width in the target raster in that the line is thinned with a periodicity of five.

4. A method according to claim 1, wherein the image data are binary data; and further comprising the step of:

employing calculating operations of Boolean algebra.

5. A method according to claim 1, wherein the conversion factor between the first and the second resolution is not a whole number.

6. A method according to claim 1, wherein the conversion factor between the first and the second resolution amounts to 2:5;

the source sub-images are quadratic and contain four source picture elements;

the target sub-images are quadratic and respectively contain twenty five target picture elements; and the following calculating operations are implemented:

a1'=A1', a2'=A1', b1'=A1', b2'=A1', b3'=A1', c1'=A1', c2'=B1', d1'=B1', d2'=B1', e1'=B1', e2'=B1', e3'=B1', a3'=A2', a4'=A2', a'=A2', b4'=A2', b5'=A2', c4'=A2', c5'=B2', d3'=B2', d4'=B2', d5'=B2', e4'=B2', e5'=B2', c3'=A1'&&B1'&&A2'&&B2'or c3'=A1'||B1'&&A2'&&B2' or the following calculating operations are implemented:

a1'=A1', a2'=A1', b1'=A1', b2'=A1', b3'=A1', c2'=B1', d1'=B1', d2'=B1', e1'=B1', e2'=B1', a4'=A2', a5'=A2', b4'=A2', b5'=A2', c4'=A2', d3'=B2', d4'=B2', d5'=B2', e4'=B2', e5'=B2', a3'=A2'||A1'&&(!B1'||!A2'||B2')

c1'=A1'||B1'&&(!A1'&&!A'''&&!B2')

c3'=(A1'&&B1')||(A1'&&A2')||(A1'&&B2')||(B1'&&A2')||(B1'&&B2')||(A2'&&B2')

c5'=B2'||A2'&&(!A1'&&!B1'&&!B2')

e3'=B1'||B2'&&(!A1'&&!B1'&&!A2')

or the following calculating operations are implemented:

a1'=A1', a2'=A1',b1'=A1',b2'=A1', d1'=B1', d2'=B1', e1'=B1', e2'=B1', a4'=A2', a'=A2', b4'=A2',b5'=A2', d4'=B2', d5'=B2', e4'=B2', e5'=B2', c1'=A1'&&B1'||B1'&&!A2'||A1'&&!B2' c2'=A1'&&B1'||A1'&&B2'||B1'&&A2' a3'=A1'&&A2'||A1'&&!B2'||!B1'&&A2' b3'=A1'&&B2'||A1'&&A2'||B1'&&A2' c 3 ' = A1'&&B1'||A1'&&A2'||A1'&&B2'||B1'&&A2'||B1'&&B2'||A2'&&B2' d3'=A1'&&B2'||B1'&&A2'||B1'&&B2' e3'=!A1 &&B2'||B1'&&!A2'||B1'&&B2' c4'=A1'&&B2'||B1'&& A2'||A2'&&B2' c5'=!A1'&&B2'||!B1 &&A2'||A2'&&B2' whereby "||" indicates a OR operation, "&&" indicates an AND operation and "!" indicates the negation;

A1 through B2 are the source picture elements arranged matrix-like whose column position is indicated by upper scale letters and whose row position within the matrix is indicated by numbers;

a1 through e5 are the target picture elements that are likewise arranged matrix-like whose column position is indicated with lower case letters and whose line position within the matrix is indicated by numbers; and the image datum belonging to a picture element is referenced by the column position and the row position of the appertaining picture element and a raised prime.

7. A method according to claim 1, wherein a division ratio of the first resolution and the second resolution amounts to 2:3, the source sub-images are quadratic and respectively contain four source picture elements, the target sub-images are quadratic and respectively contain nine target picture elements, and the following calculating operations are implemented:

a1'=a1', C1'=b1', A3'=a2', C3'=b2',
a2'=A1'||A2'&&(!A1'&&!B1'&&!B2')
b1'=B1'||A1'&&(!B1'&&!A2'&&!B2')
b2'=(A1'&&B1')||(A1'&&A2')||(A1'&&B2')|(B1'&&A2')||(B1'&&B2')||(A2'&&B2')
b3'=A2'||B2'&&(!A1'&&!B1'&&!A2')
c2'=B2'||B11'&&(!A1'&&!A2'&&!B2')

whereby "||" symbolizes the OR operation, "&&" symbolizes the AND operation and "!" symbolizes the logical negation, A1 through B2 are the source picture elements arranged matrix-like whose column position is indicated by upper scale letters and whose row position within the matrix is indicated with numbers, a1 through c3 are the target picture elements likewise arranged matrix-like whose column position is indicated with lower case letters and whose line position within the matrix is indicated with numbers, and the image datum belonging to a picture element is referenced by the column position and row position thereof with a raised prime.

8. A method according to claim 1, further comprising the step of:

presenting at least diagonal lines having the width of a source picture element in the target image as a diagonal arrangement of picture elements, the target picture elements being interconnected along a diagonal direction.

9. A method for processing image data, comprising the steps of:

defining a presentation of respective source picture elements by a source image to be processed that contains source picture elements arranged matrix-like to which respective source image data is allocated;

determining a presentation of respective target picture elements by a target image arising in processing that contains target picture elements arranged matrix-like to which respective target image data is allocated;

the source image having a first resolution corresponding to a source raster and the target image having a second resolution deviating from the first resolution and different by a conversion factor that corresponds to a target raster, said source image and said target image being binary images;

subdividing the source image into source sub-images arranged matrix-like arranging a respective target sub-image at a position in the target image that coincides with a position of the appertaining source sub-image in the source image; and performing a conversion such that a line having a non-whole-numbered line width is presented in the target raster in that it is thinned in the target raster;

wherein the target image data of an appertaining target sub-image for each source sub-image are determined from the source image data according to calculation operations that are the same for all sub-images.

10. A circuit arrangement for processing image data, comprising:

a preparation unit connected to select source image data that determine presentation of source picture elements of a source image arranged matrix-like;

a predetermined plurality of source image data being selected for source sub-images arranged matrix-like in the source image; and a conversion unit connected to generate target image data for defining the presentation of target picture elements in a target sub-image arranged matrix-like from the selected source image data;

the plurality of source image data per source sub-image and the plurality of target image data per target sub-image differ;

the respective target sub-image being arranged at a position in the target image that coincides with the position of the appertaining source sub-image in the source image;

the source image having a predetermined first resolution corresponding to a source raster and the target image having a second resolution according to a target raster that deviates from the first resolution by a conversion factor, said target image having a higher resolution than said source image, said source image and said target image being binary images; and the conversion ensues such that a line having a line width that is not a whole number is presented in the target raster in that it is thinned in the target raster.

11. A circuit arrangement for processing image data, comprising:

a preparation unit connected to select source image data that determine presentation of source picture elements of a source image arranged matrix-like;

a predetermined plurality of source image data being selected for source sub-images arranged matrix-like in the source image; and a conversion unit connected to generate target image data for defining the presentation of target picture elements in a target sub-image arranged matrix-like from the selected source image data;

the plurality of source image data per source sub-image and the plurality of target image data per target sub-image differ;

the respective target sub-image being arranged at a position in the target image that coincides with the position of the appertaining source sub-image in the source image;

the source image having a predetermined first resolution corresponding to a source raster and the target image having a second resolution according to a target raster that deviates from the first resolution by a conversion factor, said source image and said target image being binary images; and the conversion ensues such that a line having a line width that is not a whole number is presented in the target raster in that it is thinned in the target raster;

an output unit in a form of a printer unit for a permanently prescribed resolution, the output unit outputs a target image wherein a respective target sub-image is arranged at a position in the target image which coincides with a position of the appertaining source sub-image in the source image.

12. A printer having a circuit arrangement for processing image data, comprising:

a preparation unit connected to select source image data that determine a presentation of source picture elements of a source image arranged matrix-like;

a predetermined plurality of source image data being selected for source sub-images arranged matrix-like in the source image; and a conversion unit connected to generate target image data for defining the presentation of target picture elements in a target sub-image arranged matrix-like from the selected source image data;

the plurality of source image data per source sub-image and the plurality of target image data per target sub-image differing;

the respective target sub-image being arranged at a position in the target image that coincides with a position of the appertaining source sub-image in the source image;

the source image having a predetermined first resolution corresponding to a source raster and the target image having a second resolution according to a target raster that deviates from the first resolution different by a conversion factor, said target image having a higher resolution than said source image, said source image and said target image being binary images; and the conversion ensues such that a line having a line width that is not a whole number is presented in the target raster in that it is thinned in the target raster.

* * * * *